United States Patent
Fox et al.

(10) Patent No.: US 11,412,303 B2
(45) Date of Patent: Aug. 9, 2022

(54) FILTERING IMAGES OF LIVE STREAM CONTENT

(71) Applicant: International Business Machines Corporation, Armonk, NY (US)

(72) Inventors: Jeremy R. Fox, Georgetown, TX (US); Jonathan Dunne, Dungarvan (IE); Liam S. Harpur, Dublin (IE); Kelley Anders, East New Market, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/115,198

(22) Filed: Aug. 28, 2018

(65) Prior Publication Data

US 2020/0077150 A1    Mar. 5, 2020

(51) Int. Cl.
    *H04N 21/454*     (2011.01)
    *H04N 21/25*      (2011.01)
    *H04N 21/4545*    (2011.01)
    *H04N 21/2187*    (2011.01)

(52) U.S. Cl.
    CPC ..... *H04N 21/4542* (2013.01); *H04N 21/2187* (2013.01); *H04N 21/251* (2013.01); *H04N 21/45455* (2013.01)

(58) Field of Classification Search
    None
    See application file for complete search history.

(56) References Cited

U.S. PATENT DOCUMENTS

| | | | | |
|---|---|---|---|---|
| 6,052,492 A | * | 4/2000 | Bruckhaus | G11B 27/034 |
| | | | | 382/284 |
| 7,805,680 B2 | * | 9/2010 | Meyers | G06Q 30/02 |
| | | | | 715/744 |
| 8,199,965 B1 | * | 6/2012 | Basavapatna | H04L 51/12 |
| | | | | 382/100 |
| 8,359,642 B1 | * | 1/2013 | Wurtenberger | H04L 63/0227 |
| | | | | 726/7 |
| 8,893,169 B2 | | 11/2014 | Klappert | |
| 8,949,878 B2 | | 2/2015 | Dimitrova | |
| 9,980,004 B1 | * | 5/2018 | Ericson | H04N 21/4542 |
| 10,347,293 B1 | * | 7/2019 | Skinner | G11B 27/28 |
| 2002/0087403 A1 | * | 7/2002 | Meyers | G06Q 30/02 |
| | | | | 705/14.64 |
| 2002/0147782 A1 | * | 10/2002 | Dimitrova | H04N 7/163 |
| | | | | 709/207 |
| 2003/0028873 A1 | * | 2/2003 | Lemmons | H04N 7/17318 |
| | | | | 725/36 |

(Continued)

FOREIGN PATENT DOCUMENTS

| | | | | |
|---|---|---|---|---|
| CN | 103947192 A | * | 7/2014 | ....... H04N 21/44012 |
| WO | WO-2007128234 A1 | | 11/2007 | |

*Primary Examiner* — William J Kim
(74) *Attorney, Agent, or Firm* — Steven L. Nichols; Fabian VanCott

(57) ABSTRACT

A method of filtering images of live stream content may include defining a prohibited frame content template; analyzing live stream content at a frame level to determine content within each frame of the live stream content; and comparing a frame of the live stream content against the prohibited frame content template to detect prohibited content in the frame that matches prohibited frame content as defined by the prohibited frame content template.

20 Claims, 3 Drawing Sheets

(56) References Cited

U.S. PATENT DOCUMENTS

| | | | |
|---|---|---|---|
| 2007/0055980 A1* | 3/2007 | Megeid | H04N 21/25891 725/27 |
| 2008/0162652 A1* | 7/2008 | True | G06Q 10/107 709/206 |
| 2008/0282338 A1* | 11/2008 | Beer | G06F 21/566 726/12 |
| 2009/0044254 A1* | 2/2009 | Tian | G06Q 10/06 726/4 |
| 2011/0161999 A1* | 6/2011 | Klappert | H04N 21/4307 725/25 |
| 2011/0170772 A1* | 7/2011 | Dharssi | G06Q 30/0276 382/165 |
| 2011/0276652 A1* | 11/2011 | Mukherjee | H04N 19/164 709/217 |
| 2012/0173750 A1* | 7/2012 | Rakshit | H04L 29/06027 709/231 |
| 2013/0205326 A1* | 8/2013 | Sinha | G06T 1/0021 725/23 |
| 2013/0222836 A1* | 8/2013 | Kakegawa | G06F 21/55 358/1.14 |
| 2014/0208340 A1* | 7/2014 | Poornachandran | H04N 21/44218 725/10 |
| 2015/0199538 A1* | 7/2015 | Kritt | G06F 21/6245 726/26 |

* cited by examiner

FILTERING IMAGES OF LIVE STREAM CONTENT

BACKGROUND

Streaming of audio and video content has increased due to the availability of high-speed internet access. Live streaming has also increased allowing a viewer to listen to and see, in real-time or near real-time, an event occurring miles away. This increases the speed of transfer of information creating more opportunities and increased life satisfaction.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
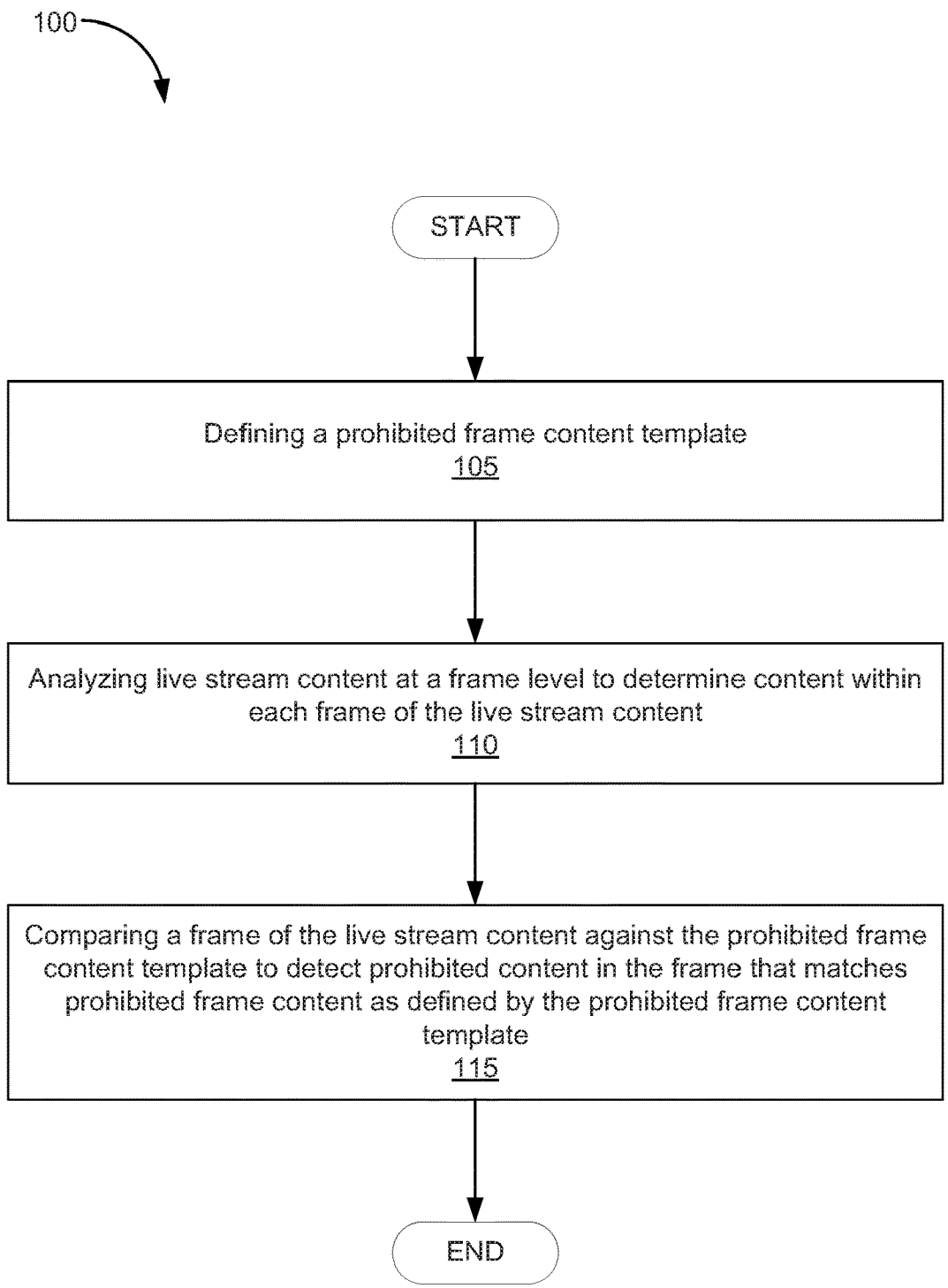
FIG. 1 is a (cross-sectional, block, perspective view) diagram of a(n) (object), according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Live streaming includes the broadcasting, over a computer network, images and audio in real-time or near real-time. Often, these live broadcasts include material that is or may be prohibited to viewers. A myriad of examples exists including morally offensive material as well as secure information that should not be consumed by the viewer. These types of prohibited content may dissuade a user from viewing a live streaming event or prevent such a live streaming event or broadcast from being created by a provider of the live stream.

One option is to allow a user to take advantage of a delay in the broadcast of the live streaming broadcast by screening the images presented to the viewer. This method implements the use of human interaction via a screening viewer who screens the images presented. Often the length of the delay that the screening viewer may use to screen the images may be as short as second. This presents the screening viewer with little time to discern what is being presented in the live streaming broadcast and implement any remedial actions in order to prevent a viewer from seeing any prohibited content presented in the live streaming broadcast. Because the screening viewer is a human, mistakes may be made by either not preventing prohibited content from being seen or mistakenly preventing the broadcast of images that is not considered as prohibited content.

The present specification describes a method of filtering images of live stream content that includes defining a prohibited frame content template; analyzing live stream content at a frame level to determine content within each frame of the live stream content; and comparing a frame of the live stream content against the prohibited frame content template to detect prohibited content in the frame that matches prohibited frame content as defined by the prohibited frame content template.

The present specification further describes a computer program product for filtering images of live stream content, the computer program product including a computer readable storage medium comprising computer usable program code embodied therewith, the computer usable program code to, when executed by a processor: define a prohibited frame content template; analyze live stream content at a frame level to determine content within each frame of the live stream content; compare a frame of the live stream content against the prohibited frame content template to detect prohibited content in the frame that matches prohibited frame content as defined by the prohibited frame content template; and, in response to the detection of prohibited frame content, take remedial action to filter the prohibited frame content.

The present specification also describes system for filtering images of live stream content that includes a computing device, including a processor; a data storage device communicatively coupled to the processor, the data storage device including: a template definition module to, when executed by the processor, define a prohibited frame content template; an analysis module to, when executed by the processor, analyze live stream content at a frame level to determine content within each frame of the live stream content; and a comparison module to, when executed by the processor, compare a frame of the live stream content against the prohibited frame content template to detect prohibited content in the frame that matches prohibited frame content as defined by the prohibited frame content template.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used in the present specification and in the appended claims, the term "prohibited content" or "prohibited frame content" is meant to be understood as any content that is to not be seen by the user. The criteria on whether content is to be seen or not may be defined by either the viewer, the provider of the content in the live stream content, or any third party associated with the live stream content or its broadcast.

As used in the present specification and in the appended claims, the term "subgroup" includes an amount included in the total amount but less than the total amount.

Turning now to the figures, FIG. 1 is a flowchart showing a method (100) of filtering images of live stream content according to an example of the principles described herein. The method (100) may include defining (105) a prohibited frame content template. In an example, a set of prohibited frame content templates may be defined that are categorized into classes or types of images that are to or may be prohibited from view. Examples of classes or types of images may include sexually explicit images, weapon images such as handguns, images that include text that includes offensive language, images of people using profanity, and images of confidential information, among other types or classes of images that may be prevented from being viewed by a user. Specific pixels that define an image that depict these types or classes of images may then be defined. By way of example, a class or type of image may include a handgun. In this example, prohibited frame content templates may include a database of any number of images of a handguns. The pixels defining these images of the handguns may each and individually be used as a prohibited frame content template. Indeed, any image of a handgun from any angle with each associated set of pixel data may be used as a prohibited frame content template. An image database may be maintained with these images used to define the prohibited frame content templates. In an example, this database may be maintained within a server system either maintained locally or accessible offsite via a computer network. In any example, presented herein the prohibited frame content templates may be stored in a data storage device for access during the process.

Once any number of prohibited frame content templates have been defined (105), the method (100) may continue with analyzing (110) live stream content at a frame level to determine content within each frame of the live stream content. In an example, the live steam content is analyzed (110) at an b-frame level, an I-frame level, and/or a p-frame level. An i-frame level analysis (110) may include analyzing a complete image such as a .jpg or .bmp image file for specific pixels defined by the prohibited frame content templates. Because of video compression implementing I-frames include parts of image information, those potions of the image that changes between frames may be analyzed (110) instead of the image as a whole. This may result in relatively quicker analysis (110) of each frame within the live stream content thereby speeding up the process described herein. In an example, the I-frames may define what images are predicted to be presented in the next 30 or so frames.

A b-frame level analysis (110) may include determining the differences between a first frame and its bordering frames (those frames that precede and follow the first frame). Content, and specifically the prohibited frame content, may be determined by discerning the differences between the first frame, a preceding frame, and a following frame.

A p-frame level analysis (110) may include determining the differences between the first frame and a previous frame such as determining a scene in a background of the image does not change, but that in the first image, a foreground object has changed position relative to the same object in the previous frame.

In any example presented herein, analyzing (110) live stream content comprises using a computer vision process. In this example, the computer vision process may identify the prohibited content as defined by the prohibited frame content template. The computer vision process may include any method for acquiring, processing, analyzing, and understanding digital images in order to produce numerical or symbolic information for the purpose of comparing a frame image of the live stream against the prohibited frame content template. In an example, the computer vision process comprises using machine learning processes.

Once the content in each frame has been analyzed (110) using any or a combination of the frame-level analysis described herein, the method (100) may continue with comparing a frame of the live stream content against the prohibited frame content template in order to detect prohibited content in the frame that matches prohibited frame content as defined by the prohibited frame content templates. Again, using any type of frame-level analysis, the method (100) may determine which objects defined by pixels within the frame or the entire frame has changed. In the context where an I-frame analysis (110) is used, the pixels and/or a subgroup of pixels within any given frame is compared (115) to any of the pixels defined in the prohibited frame content template. In the context where a b-frame analysis (110) is used, those pixels defining the differences between the first frame, a preceding frame, and a following frame are compared (115) to the prohibited frame content template. In the context where a p-frame analysis (110) is used, those pixels defining the differences between the first frame and a previous frame are compared (115) to the prohibited frame content template.

Other examples exist where multiple frame-level analysis (110) are used and the comparison of specific pixels within the image or a sub-group of the pixels within any given image are compared (115) to the prohibited frame content template. Indeed, the present method (100) contemplates the use of each of the I-, b-, and/or p-frame analysis (110) to be conducted concurrently or sequentially in order to make the comparison (115) between the prohibited frame content template and any number of pixels within any given frame of the live stream content. Such an analysis (110) and comparison (115) may be completed for each frame of the live stream content in real time as the live stream is being presented.

In examples where an I-, b-, and/or p-frame analysis (110) is conducted, where the comparison (115) of a first frame indicates prohibited frame content based on the prohibited frame content template, the analysis (110) of any subsequent frame may be weighted, for example, so as to assume that the same or similar prohibited frame content is also included in that frame. This way, the method (100) may proceed relatively quicker during the real-time analysis described in connection with the method (100).

Where comparing (115) a frame of the live stream content against the prohibited frame content template results in a determinization that prohibited frame content is present in the frame, a number of remedial actions may be implemented for that frame. In an example, the image presented in that frame may be entirely blackened or blurred out so as to prevent the user from seeing any image at all for that frame during the live streaming of the content. In an example, the remedial action comprises alerting a user to the existence of prohibited frame content within the live stream content, obfuscating a portion of a frame containing the prohibited frame content, automatically performing take down process where at least a portion of the live stream content is removed from live streaming, blocking users from accessing the live stream content, or combinations thereof.

In an example, certain portions of the frame may be blackened or blurred out so as to hide the prohibited frame content from being viewed. In this example, the pixels within the frame that have been determined to include prohibited frame content may be changed so as to be a single color or be blurred so that a user may not discern what the prohibited frame content is In the example where, certain portions of the frame may be blackened or blurred, these certain portions may be defined by the extreme positions of the pixels defining the prohibited frame content. For example, an extreme left, right, top, and or/bottom pixel of the prohibited frame content may be determined and used to create a box or bar within the frame that is blackened or blurred. In an example, an extreme outer diameter pixel of the prohibited frame content may be used to define an outline of the prohibited frame content so as to create a blackened or blurred image over those pixels and every pixel within that outline. Indeed, once the pixels defining the prohibited frame content have been identified, any number of image distortion methods may be used to prevent a viewer from seeing the prohibited frame content during the live streaming event. The present specification, therefore, contemplates the use of any type of masking or covering up method in order to prevent the viewer from seeing the prohibited frame content.

Figure 2:
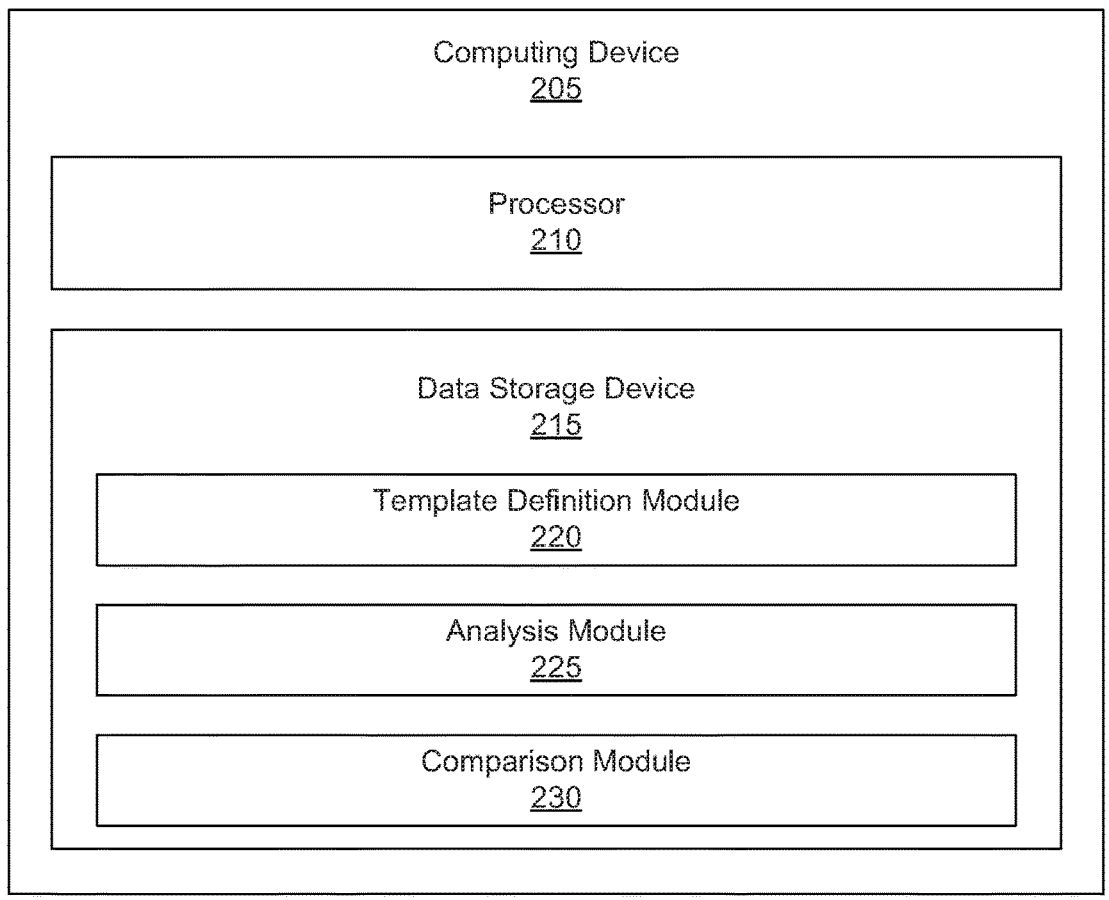
FIG. 2 is a block diagram of a system for filtering images of live stream content according to an example of the principles described herein.

FIG. 2 is a block diagram of a system (200) for filtering images of live stream content according to an example of the principles described herein. The system (200) may include a computing device (205). The computing device (205) may include any type of computing device such as servers, desktop computers, laptop computers, personal digital assistants (PDAs), mobile devices, smartphones, gaming systems, and tablets, among other computing devices.

The computing device (205) may include a processor (210). The processor (210) may execute any computer-readable program code that, when executed, performs, at least, the processes described in connection with FIG. 1 and the method of filtering images of a live stream content. In any example presented herein, the processor may include any type of processing device that may define a prohibited frame content template; analyze live stream content at a frame level to determine content within each frame of the live stream content; and compare a frame of the live stream content against the prohibited frame content template to detect prohibited content in the frame that matches prohibited frame content as defined by the prohibited frame content template.

The computing device (205) may include a data storage device (215). The data storage device (215) may include various types of memory modules, including volatile and nonvolatile memory. For example, the data storage device (215) of the present example may include Random Access Memory (RAM), Read Only Memory (ROM), and Hard Disk Drive (HDD) memory. Many other types of memory may also be utilized, and the present specification contemplates the use of many varying type(s) of memory in the data storage device (215) as may suit a particular application of the principles described herein. In certain examples, different types of memory in the data storage device (215) may be used for different data storage needs. For example, in certain examples the processor (210) may boot from Read Only Memory (ROM), maintain nonvolatile storage in the Hard Disk Drive (HDD) memory, and execute program code stored in Random Access Memory (RAM).

Generally, the data storage device (215) may comprise a computer readable medium, a computer readable storage medium, or a non-transitory computer readable medium, among others. For example, the data storage device (215) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The data storage device (215) may include a template definition module (220). The template definition module (220) may create a set of prohibited frame content templates as described herein. In an example, a set of prohibited frame content templates may be defined that are categorized into classes or types of images that are to or may be prohibited from view. Examples of classes or types of images may include sexually explicit images, weapon images such as handguns, images that include text that includes offensive language, images of people using profanity, and images of confidential information, among other types or classes of images that may be prevented from being viewed by a user. Specific pixels that define an image that depict these types or classes of images may then be defined. By way of example, a class or type of image may include a handgun. In this example, prohibited frame content templates may include a database of any number of images of a handguns. The pixels defining these images of the handguns may each and individually be used as a prohibited frame content template. Indeed, any image of a handgun from any angle with each associated set of pixel data may be used as a prohibited frame content template. An image database may be maintained with these images used to define the prohibited frame content templates. In an example, this database may be maintained within a server system either maintained locally or accessible offsite via a computer network.

The data storage device (215) may include an analysis module (225). The analysis module (225) may, during operation of the computing device (205), analyze live stream content at a frame level to determine content within each frame of the live stream content as described herein. In an example, analyzing the live stream content with the analysis module (225) includes using a computer vision process to identify prohibited content as defined by the prohibited frame content templates defined by the template definition module (220). In an example, the computer vision process may include implementing a machine learning process.

The data storage device (215) may include a comparison module (230). The comparison module (230) may compare a frame of the live stream content against the prohibited frame content template in order to detect prohibited content in the frame that matches prohibited frame content as defined by the prohibited frame content templates as described herein.

In an example, the data storage device (215) may include a remediation module. The remediation module may, when executed by the processor (210), take remedial action to filter the prohibited frame content in response to the detection of prohibited frame content. As described herein, the remedial action may include alerting a user to the existence of prohibited frame content within the live stream content, obfuscating, hiding, or otherwise masking a portion of a frame or the entire frame containing the prohibited frame content, automatically performing take down process where at least a portion of the live stream content is removed from live streaming, blocking users from accessing the live stream content, or combinations thereof.

The template module (220), the analysis module (225), the comparison module (230), and/or the remediation module may be used to increase the viewability of the live streaming content. Specifically, the modules may provide a viewer and/or supplier of the live streaming content with the ability to determine what should and should not be presented to the viewer. Specifically, the live streaming content may be altered to prevent the viewer from seeing prohibited content during the live streaming process. The computing device (205) specifically implements an analysis, on a frame by frame basis, of the content of the live stream by comparing the content in each frame to a prohibited frame content template in real-time. As such, a seamless live streaming content may be provided to the viewer with no interruption in the presentation of the live streaming content.

Figure 3:
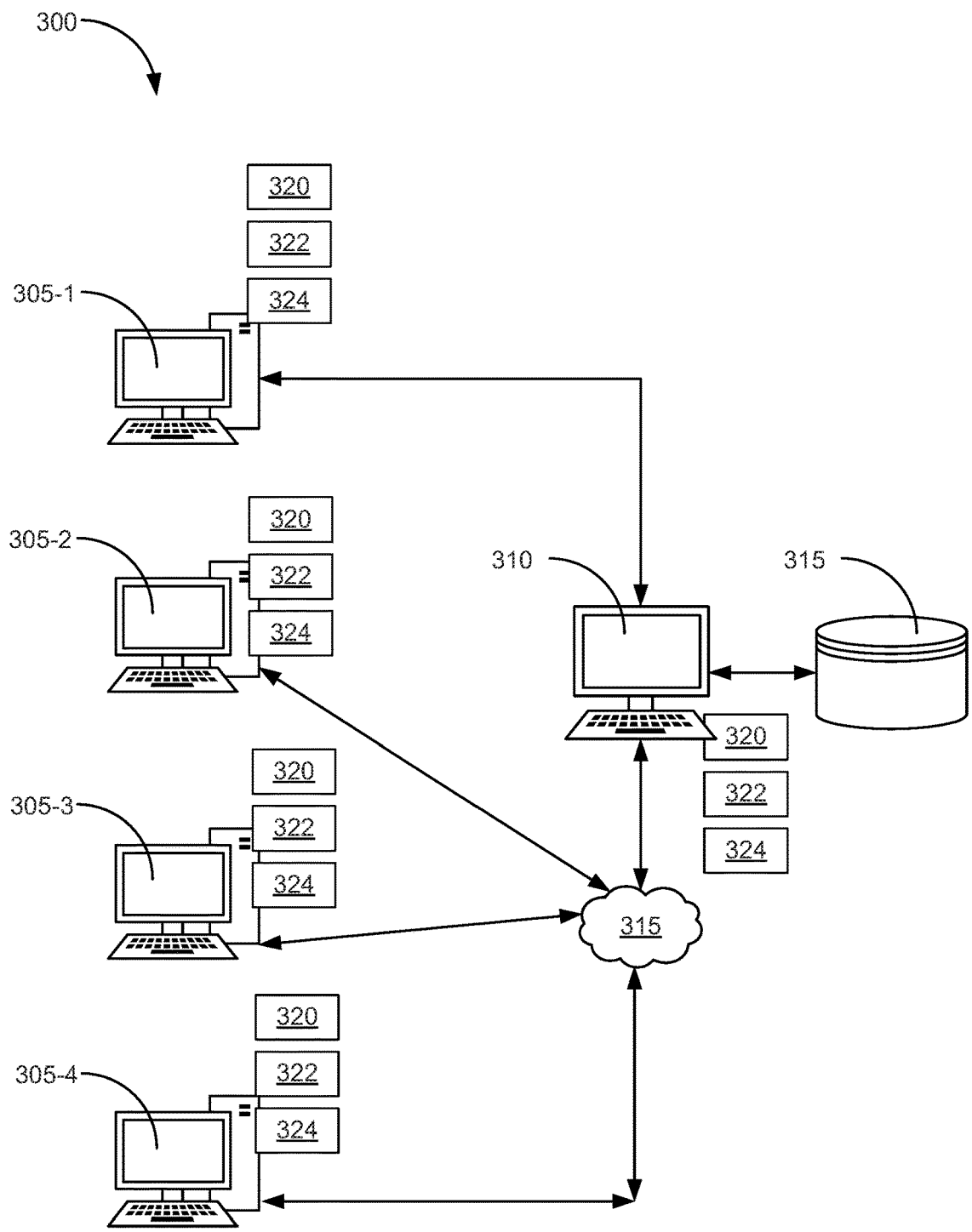
FIG. 3 is a block diagram of a live stream filtering computer network (300) according to an example of the principles described herein.

The computing device (200) of FIG. 2 may be operated over a computer network. FIG. 3 is a block diagram of a live stream filtering computer network (300) according to an example of the principles described herein. In this example, the network (300) may include any number of client computing devices (305-1-305-4) and may be less than or exceed the number of computing devices (305-1-305-4) depicted in FIG. 3.

Each of the computing devices (305-1-305-4) may be communicatively coupled to a server (310). In an example, some client computing devices (305-1) may be communicatively coupled to the server (310) via a local area connection such as over an ethernet connection. In an example, the client computing devices (305-1-305-4) may be communicatively coupled to the server (310) over a wireless connection (315) that implements, for example, a network interface controllers (NIC), repeaters, hubs, bridges, switches, routers, modems, and/or firewalls.

The server (310) may include a database (315). The database (315) may maintain a number of images associated with the prohibited frame content templates described herein. In an example, the images used to create the prohibited frame content templates as well as the prohibited frame content templates themselves may be maintained on the database (315) communicatively coupled to the server (310).

As described herein, any one of the client computing devices (305-1-305-4) and/or the server (310) may include a template definition module (320), an analysis module (322), and/or a comparison module (324). The present specification contemplates that any one of the client computing devices (305-1-305-4) and/or server (310) may include a processor that executes computer readable program code defining any one of the modules (320, 322, 324) described herein.

During operation, any one of the client computing devices (305-1-305-4) and/or server (310) may create a set of prohibited frame content templates, analyze live stream content at a frame level to determine content within each frame of the live stream content, and/or compare a frame of the live stream content against the prohibited frame content template in order to detect prohibited content in the frame that matches prohibited frame content as defined by the prohibited frame content templates as described herein. In an example, each of the client computing devices (305-1-305-4) may communicate with the server (310) in order to access a number of prohibited frame content templates created and maintained on the database (315). As such, each of the client computing devices (305-1-305-4) may treat the server (310) and its database (315) as a service over a network allowing the server (310) to create and/or maintain the images and prohibited frame content templates while providing a central location for each of the client computing devices (305-1-305-4) to access the prohibited frame content templates during a live streaming event.

In an example, the server (310) may group the images and/or prohibited frame content templates into different categories, classes, or types based on the prohibited content within those images. Consequently, images grouped into specific prohibited content groups may be used to form prohibited frame content templates within that category, class, or type of prohibited content. As such the prohibited frame content templates may be grouped based on the type of prohibited content of the images used such as sexually explicit images, weapon images such as handguns, images that include text that includes offensive language, images of people using profanity, and images of confidential information, among other types or classes of images that may be prevented from being viewed by a user. With the server (310), each of the client computing devices (305-1-305-4) may subscribe to certain categories of prohibited frame content templates and be authorized to access those prohibited frame content templates during a live streaming event. Indeed, in this example, each client computing device (305-1-305-4) may tailor the type of content shown or not shown within individual live streaming events.

The implementation of the centralized server (310) with the database (315) improves the functioning of each of the client computing devices (305-1-305-4) by reducing the image data processing conducted by each individual client computing devices (305-1-305-4). Instead, each of the client computing devices (305-1-305-4) may access any number of prohibited frame content templates while live streaming so as to improve the speed at which content in any given live streaming event on any of the client computing devices (305-1-305-4) is conducted quickly, Due to the nature of the live streaming event, each processor of the client computing devices (305-1-305-4) may utilize the processing power and database (315) associated with the server (310) thereby increasing the likelihood of any prohibited content displayed in the live streaming event being obfuscated or otherwise rendered unviewable by a viewer of the live streaming content. Because each of the client computing devices (305-1-305-4) may subscribe to certain categories, classes, and/or types of prohibited frame content templates, the viewable content within each of the live streaming events may be customized for each individual client computing devices (305-1-305-4).

In any example presented herein, the data storage device (215) may be communicatively coupled to a database accessible by the computing device (205) via, for example, a network adapter. In this example, the database may store the prohibited frame content templates as described herein. In this example, regardless of the source of the live stream images, the computing device (205) may access, over a network, the database in order to compare the frame of the live stream content against the prohibited frame content template to detect prohibited content in the frame that matches prohibited frame content as defined by the prohibited frame content template. The database of prohibited frame content templates may also be maintained on any database either apart from or integral to the computing device (205). By allowing any computing device (205) coupled to the database via a network to access to the database, a service may be executed over the network with any number of computing devices (205) concurrently presenting and augmenting their respective live streaming contents independent of each other. Having such a centralized database of prohibited frame content templates also allows each computing device to access the prohibited frame content templates, on a subscriber bases for example, so as to present each individual computing device (205) with a customized set of prohibited frame content templates based on the viewer's and/or presenter's definition of prohibited content.

The methods and systems may be realized via a computer program product for filtering images of live stream content. In this example, the computer program product may include a computer readable storage medium comprising computer usable program code embodied therewith. The computer usable program code may, when executed by a processor (210), define a prohibited frame content template. The computer usable program code may, when executed by a processor (210), analyze live stream content at a frame level to determine content within each frame of the live stream content. The computer usable program code may, when executed by a processor (210), compare a frame of the live stream content against the prohibited frame content template to detect prohibited content in the frame that matches prohibited frame content as defined by the prohibited frame content template. The computer usable program code may, when executed by a processor (210) and in response to the detection of prohibited frame content, take remedial action to filter the prohibited frame content.

In any example presented herein, the live stream content may be streamed using real time streaming protocol (RTSP). RTSP is a network control protocol designed for use in entertainment and communications systems to control streaming media servers. The protocol is used for establishing and controlling media sessions between end points. Clients of media servers issue VCR-style commands, such as play, record and pause, to facilitate real-time control of the media streaming from the server to a client (Video on Demand) or from a client to the server (Voice Recording).

The system (200) may be utilized in any data processing scenario including, stand-alone hardware, mobile applications, through a computing network, or combinations thereof. Further, the system (200) may be used in a computing network, a public cloud network, a private cloud network, a hybrid cloud network, other forms of networks, or combinations thereof. In one example, the methods provided by the system (200) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the system (200) are executed by a local administrator.

To achieve its desired functionality, the computing device (205) may include various hardware components. Among these hardware components may be a number of processors (210), a number of data storage devices (215), a number of peripheral device adapters, and a number of network adapters. These hardware components may be interconnected through the use of a number of busses and/or network connections. In one example, the processor (210), data storage device (215), peripheral device adapters, and a network adapter may be communicatively coupled via a bus.

The processor (210) may include the hardware architecture to retrieve executable code from the data storage device (215) and execute the executable code. The executable code may, when executed by the processor (210), cause the processor (210) to implement at least the functionality of defining a prohibited frame content template; analyzing live stream content at a frame level to determine content within each frame of the live stream content; comparing a frame of the live stream content against the prohibited frame content template to detect prohibited content in the frame that matches prohibited frame content as defined by the prohibited frame content template; and taking remedial action to filter the prohibited frame content, according to the methods of the present specification described herein. In the course of executing code, the processor (210) may receive input from and provide output to a number of the remaining hardware units.

The hardware adapters in the computing device (205) enable the processor (210) to interface with various other hardware elements, external and internal to the computing device (205). For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

The display device may be provided to allow a user of the computing device (205) to interact with and implement the functionality of the system (200) described herein. The peripheral device adapters may also create an interface between the processor (210) and the display device, a printer, or other media output devices. The network adapter may provide an interface to other computing devices within, for example, a network, thereby enabling the transmission of data between the computing device (205) and other devices located within the network such as the database of prohibited frame content templates as described herein.

As described herein, the computing device (205) includes a number of modules used in the implementation of the computing device (205) The various modules within the computing device (205) comprise executable program code that may be executed separately. In this example, the various modules may be stored as separate computer program products. In another example, the various modules within the computing device (205) may be combined within a number of computer program products; each computer program product comprising a number of the modules.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (210) of the computing device (205) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a system and method that allows live stream providers with the ability to determine if prohibited content is being streamed and selectively allowing and disallowing the prohibited content from being viewed by a user. The present specification describes a system that compares a live streamed presentation with a prohibited frame content template that infers whether prohibited content is being streamed. The present system and method also use this result to provide remedial action (e.g. alerting, obfuscation, auto take down, blocking) to prevent a viewer from viewing the frames including that prohibited frame content.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of filtering images of live stream content, comprising:
   defining a prohibited frame content template, wherein a prohibited frame content of the prohibited frame content template comprises images;
   receiving a subscription of categories of prohibited frame content templates from a user, wherein a subscription indicates content to be prohibited;
   analyzing portions of frames of live stream content in real time to determine content within each frame of the live stream content, wherein portions that are analyzed comprise portions of frames that change between frames;
   comparing the content within each frame of the live stream content against a subscribed to prohibited frame content template to detect prohibited content in the frame that matches prohibited frame content as defined by the subscribed to prohibited frame content template; and
   identifying, within the frame and based on the subscription, an outline of the prohibited content and blurring a portion of the frame within the outline.

2. The method of claim 1, wherein analyzing the live stream content comprises using a computer vision process to identify prohibited content as defined by the subscribed to prohibited frame content template.

3. The method of claim 1, wherein comparing the frame of the live stream content against the subscribed to prohibited frame content template comprises comparing an I-frame of the live stream content, the I-frame content comprising frame content for a plurality of subsequent frames in the live stream content.

4. The method of claim 3, wherein the subsequent frames comprise P-frames, B-frames, or combinations thereof.

5. The method of claim 1, wherein the prohibited content further comprises: sexually explicit images, weapon images, and images of people using profanity.

6. The method of claim 1, wherein blurring a portion of the frame comprises:
   identifying an extreme left pixel, an extreme right pixel, an extreme top pixel, and an extreme bottom pixel of the prohibited content; and
   generating a box bound by the extreme left pixel, the extreme right pixel, the extreme top pixel, and the extreme bottom pixel to enclose the prohibited content; and
   blurring a region defined by the box.

7. The method of claim 1, wherein analyzing portions of frames comprises simultaneously analyzing I-frames, B-frames, and P-frames.

8. A computer program product for filtering images of live stream content, the computer program product comprising:
   a computer readable storage medium comprising computer usable program code embodied therewith, the computer usable program code to, when executed by a processor:
   define a prohibited frame content template, wherein a prohibited frame content in the prohibited frame content template comprises images;
   categorize the prohibited frame content template based on types of images to be prohibited;
   receive a subscription of categories of prohibited frame content templates from a user, wherein a subscription indicates a type of image to be prohibited;
   analyze portions of frames of live stream content frame-by-frame in real time to determine content within each frame of the live stream content, wherein portions that are analyzed comprise portions of frames that change between frames;
   compare a first frame of the live stream content against a subscribed to prohibited frame content template to detect prohibited content comprising content in the first frame that matches prohibited frame content as defined by the subscribed to prohibited frame content;
   simultaneously compare a second frame of the live stream content against the subscribed to prohibited frame template to detect prohibited content in the second frame; and
   in response to detection of prohibited content, take remedial action to filter the prohibited content in both the first frame and the second frame.

9. The computer program product of claim 8, wherein analyzing the live stream content comprises using a computer vision process to identify prohibited content as defined by the subscribed to prohibited frame content template.

10. The computer program product of claim 9, wherein the computer vision process comprises using machine learning processes.

11. The computer program product of claim 8, comprising computer usable program code to, when executed by the processor, store the prohibited frame content template in a database.

12. The computer program product of claim 8, wherein the remedial action comprises alerting a user to the existence of prohibited frame content within the live stream content, obfuscating a portion of a frame containing the prohibited frame content, automatically performing take down process where at least a portion of the live stream content is removed from live streaming, blocking users from accessing the live stream content, or combinations thereof.

13. The computer program product of claim 8, wherein comparing the frame of the live stream content against the subscribed to prohibited frame content template comprises comparing an I-frame of the live stream content, the I-frame content comprising frame content for a plurality of subsequent frames in the live stream content.

14. The computer program product of claim 13, wherein the subsequent frames comprise P-frames, B-frames, or combinations thereof.

15. The computer program product of claim 8, wherein analyzing the live stream content comprises using a computer vision process to identify prohibited content as defined by the subscribed to prohibited frame content template, wherein the computer vision process comprises using machine learning processes;
   wherein comparing the frame of the live stream content against the prohibited frame content template comprises comparing an I-frame of the live stream content, the I-frame content comprising frame content for a plurality of subsequent frames in the live stream content, and wherein the subsequent frames comprise P-frames, B-frames, or combinations thereof; and wherein the prohibited content further comprises: sexually explicit images, weapon images, and images of people using profanity.

16. A system for filtering images of live stream content, comprising:
a computing device, comprising:
a processor;
a data storage device communicatively coupled to the processor, the data storage device comprising:
a template definition module to, when executed by the processor;
define a prohibited frame content template, wherein the prohibited frame content template comprises an image;
categorize the prohibited frame content template based on types of images to be prohibited; and
receive a subscription of categories of prohibited frame content templates from a user, wherein a subscription indicates a type of image to be prohibited;
an analysis module to, when executed by the processor, analyze portions of frames of live stream content to determine content within each frame of the live stream content, wherein:
portions that are analyzed comprise portions of frames that change between frames; and
a subsequent frame is weighted as including prohibited content based on a previous frame comprising prohibited content; and
a comparison module to, when executed by the processor, compare a frame of the live stream content against a subscribed to prohibited frame content template to detect prohibited content comprising an image of confidential information in the frame that matches prohibited frame content as defined by the subscribed to prohibited frame content template, and propagate detection of prohibited frame content detected in an I-frame into a subsequent P-frame or B-frame.

17. The system of claim 16, comprising a remediation module to, when executed by the processor, take remedial action to filter the prohibited frame content in response to the detection of prohibited frame content.

18. The system of claim 17, wherein the remedial action comprises alerting a user to the existence of prohibited frame content within the live stream content, obfuscating a portion of a frame containing the prohibited frame content, automatically performing take down process where at least a portion of the live stream content is removed from live streaming, blocking users from accessing the live stream content, or combinations thereof.

19. The system of claim 16, wherein:
analyzing the live stream content comprises using a computer vision process to identify prohibited content as defined by the subscribed to prohibited frame content template;
wherein the computer vision process comprises using machine learning processes.

20. The system of claim 16, comprising a database coupled to the computing device to store the prohibited frame content template.

* * * * *